(12) United States Patent
Ulug et al.

(10) Patent No.: US 8,433,053 B2
(45) Date of Patent: Apr. 30, 2013

(54) VOICE USER INTERFACES BASED ON SAMPLE CALL DESCRIPTIONS

(75) Inventors: Amy Ulug, San Jose, CA (US); Rakesh Ramadas, Sunnyvale, CA (US); Suresh Panganamala, Fremont, CA (US); Stephen R. Springer, Needham, MA (US)

(73) Assignee: Nuance Communications, Inc., Burlington, MA (US)

( * ) Notice: Subject to any disclaimer, the term of this patent is extended or adjusted under 35 U.S.C. 154(b) by 1483 days.

(21) Appl. No.: 12/028,138

(22) Filed: Feb. 8, 2008

(65) Prior Publication Data
US 2009/0202049 A1 Aug. 13, 2009

(51) Int. Cl.
*H04M 3/00* (2006.01)
*H04M 5/00* (2006.01)
*G06F 9/455* (2006.01)
*G10L 11/00* (2006.01)

(52) U.S. Cl.
USPC .............. 379/266.07; 379/265.02; 703/26; 704/270

(58) Field of Classification Search ..... 379/265.01–267, 379/258, 259, 260, 261, 262, 263, 264; 703/26; 704/270
See application file for complete search history.

(56) References Cited

U.S. PATENT DOCUMENTS

| | | | |
|---|---|---|---|
| 7,936,863 B2 * | 5/2011 | John et al. | 379/201.01 |
| 2006/0206299 A1 * | 9/2006 | Scholz et al. | 703/26 |
| 2007/0106515 A1 * | 5/2007 | Wong | 704/270 |
| 2007/0234279 A1 * | 10/2007 | Brill et al. | 717/104 |

\* cited by examiner

*Primary Examiner* — Khai N Nguyen
(74) *Attorney, Agent, or Firm* — Sunstein Kann Murphy & Timbers LLP

(57) ABSTRACT

A design interface is described for maintaining call information for creating a voice user interface. An initial set of sample call paths is defined for a dialog application. Each sample call path has associated call information including a sequence of system prompts and caller responses that model a user interaction through the dialog application for the sample call path. A call design database stores the call information. A set of subsequent call paths is defined for the dialog application using the call information in the call design database. The call information in the call design database is updated to reflect current versions of the call information for all the call paths.

27 Claims, 6 Drawing Sheets

NAS - Sample Calls - main::Start - Eclipse SDK

File  Edit  Navigate  Search  Project  Tools  Run  Window  Help

*Sample Call Details X

Name: Bluetooth Troubleshooting

Description: This call shows how a caller might access the bluetooth troubleshooting option.

Sample Call Details — 200

| # | Speaker | Transcript | Comment |
|---|---------|-----------|---------|
| 1 | SYSTEM | Thanks for calling QualPhone. | |
| 2 | SYSTEM | To continue this call in English, say English: | |
| 3 | SYSTEM | for help in Spanish, say Spanish. | in <Spanish> |
| 4 | CALLER | english | |
| 5 | SYSTEM | Are you calling about: cellular phone or accessories? | |
| 6 | CALLER | yes | |
| 7 | SYSTEM | Ok, now in just a few words, please tell me why you're calling. For example just say, "I need help setting up voice mail", or "I've got a warranty question". Go ahead... | |
| 8 | CALLER | because my bluetooth is messed up | |
| 9 | SYSTEM | You're calling about Bluetooth. Is that right? | |
| 10 | CALLER | yes | |

*Sample Call Manager  *System Prompts X  *Caller Prompts — 203

204

| # | Prompt Transcript | Pro...ype | Nod...ype | Node |
|---|-------------------|-----------|-----------|------|
| 1 | for help in Spanish, say Spanish. | Initial | Recognitio | LanguageSelection |
| 2 | You're calling for technical support. Is that right? | Initial | Recognitio | TechSupport_confirm |
| 3 | You're calling about a warranty. Is that right? | Initial | Recognitio | |
| 4 | You're calling about Speed Dial. Is that right? | Initial | Recognitio | SpeedDial_confirm |
| 5 | You're calling about Bluetooth. Is that right? | Initial | Recognitio | Bluetooth_confirm |
| 6 | You can choose: buy a Bluetooth, setup a Bluetooth, troubleshooting, or warranty. | Initial | Recognitio | Bluetooth_Menu |
| 7 | You can choose "installing a battery", "charging in another country", "battery error message on my phone" or other battery issues" | Error-Nomatch 1 | Recognitio | Battery_MainMenu |
| 8 | To continue this call in English, say English. | Initial | Recognitio | LanguageSelection |
| 9 | Thanks for calling QualPhone. | Initial | Processing | Welcome |
| 10 | Speed Dial questions... | Initial | Transfer | SpeedDial_Transfer |
| 11 | Speed Dial questions... | | | |
| 12 | Ok, other options are "Product Sales Department", "Connecting my phone to my computer", my wireless service plan", "Charging and Batteries", or "Popular phone features". | Initial | Recognitio | TechSupport_OtherOptions |
| 13 | Ok, now in just a few words, please tell me you're calling. For example just say, "I | Initial | Recognitio | MainMenu |

QualPhone 201
202

FIG. 4

VOICE USER INTERFACES BASED ON SAMPLE CALL DESCRIPTIONS

FIELD OF THE INVENTION

The present invention relates to call routing software, and more specifically, to the use of sample calls to design such software.

BACKGROUND ART

Dialog applications provide a voice user interface that allows an application user to interact with other computer applications to perform various tasks. For example, a voice user interface may allow a telephone caller to check charges on their credit card or manage travel plans. The dialog application responds to caller inputs and response by providing various dialog prompts that advance the caller through a specific task.

FIG. 1 A-C illustrates various ways to implement a portion of a simple dialog process to determine a desired travel destination of a caller. Each of the three sample calls shown has an initial collection process followed by a confirmation process. Each of three different dialogs starts with the same initial system prompt, an inquiry to the caller: "Where are you flying to?" In FIG. 1A, the User replies, "Boston," ending the collection process and entering the confirmation process in which the next system prompt is for confirmation of the previous input: "Ok. Austin. Please say yes or no." In the dialog shown in FIG. 1A, the caller response, "No." sends the process back to the beginning of the collection process where the first system prompt is repeated. The process depicted in FIG. 1B is slightly different in that the user responds to the confirmation prompt with: "No, Boston." That response returns the dialog application back to the beginning of the confirmation process where the confirmation prompt is repeated (hopefully with Boston instead of Austin). FIG. 1C depicts another variant dialog in which the caller response to the collection prompt is different: "I'd like to fly to Boston tomorrow." The resulting confirmation prompt is more complex, seeking to confirm both destination and time.

Designers of voice user interfaces tend to model user interactions with the dialog system they are creating by sketching out sample calls. Sample calls are scripts that outline how a conversation might proceed between a caller and the automated dialog system. The interface designer uses these sketches to provide examples of how a caller might accomplish a particular task and to layout the interaction style that is to be adopted. Each sample call corresponds to a path through the structure of an application.

Designing with sample calls allows modeling of the sample interaction paths through the dialog application without requiring that the complete system structure be fully defined. Additionally, the designer can better focus on creating a user dialog experience that effectively and efficiently completes the task rather than being stifled by details that are overly technical or architectural (but which need attention at some later phase in designing the system).

Commonly, voice interface designers write sample call sketches on paper or in text documents that are then used to communicate their design intentions with the major application stakeholders. This methodology has provided benefits to the designers and stakeholders for understanding how the dialog will flow, but these benefits are short-lived. The information captured in the sample calls often becomes stale, and the initial sample calls remain very much "preliminary" sketches that are not easily integrated or accessible for the next phases of the system design such as creating the application structure ("call flow") and specifying details around each step of the user dialog interaction.

Shortly after the sample calls are completed and communicated to the application stakeholders, the information presented in them (e.g., prompts and grammars) becomes out of date and no longer representative of the current system design, and thus not useful. As designers move to subsequent phases of the application design, they end up recreating a new version of the call information and are forced to stay in the mode of the next phase of design.

SUMMARY OF THE INVENTION

A design interface maintains call information for creating a voice user interface. An initial set of sample call paths is defined for a dialog application. Each sample call path has associated call information including a sequence of system prompts and caller responses that model a user interaction through the dialog application for the sample call path. A call design database stores the call information. A set of subsequent call paths is defined for the dialog application using the call information in the call design database. The call information in the call design database is updated to reflect current versions of the call information for all the call paths.

In specific embodiments, an Eclipse-based development platform may be used for defining and creating the call paths. In such embodiments, it may be useful to provide a single perspective for processing the call paths. The current versions of the call information in the call design database may usefully be synchronized with other dialog design processes.

Specific embodiments may also include a sample call manager view for listing available sample call paths through the dialog application. A sample call details view may be used to view a model of a sample call path through the dialog application. A system prompts view may provide information related to the system prompts. A caller responses view may provide information related to the caller responses.

Specific embodiments may also link the call information in the call design database so that making a change in the call information in one call path causes that call information to be updated in every other call path where it is used. In addition or alternatively, the call information may be annotated to reflect its usage in the dialog application.

BRIEF DESCRIPTION OF THE DRAWINGS

FIGS. 2-4 show a design interface for creating a voice user interface for a dialog application according to one embodiment of the present invention.

DETAILED DESCRIPTION OF SPECIFIC EMBODIMENTS

Figure 1:
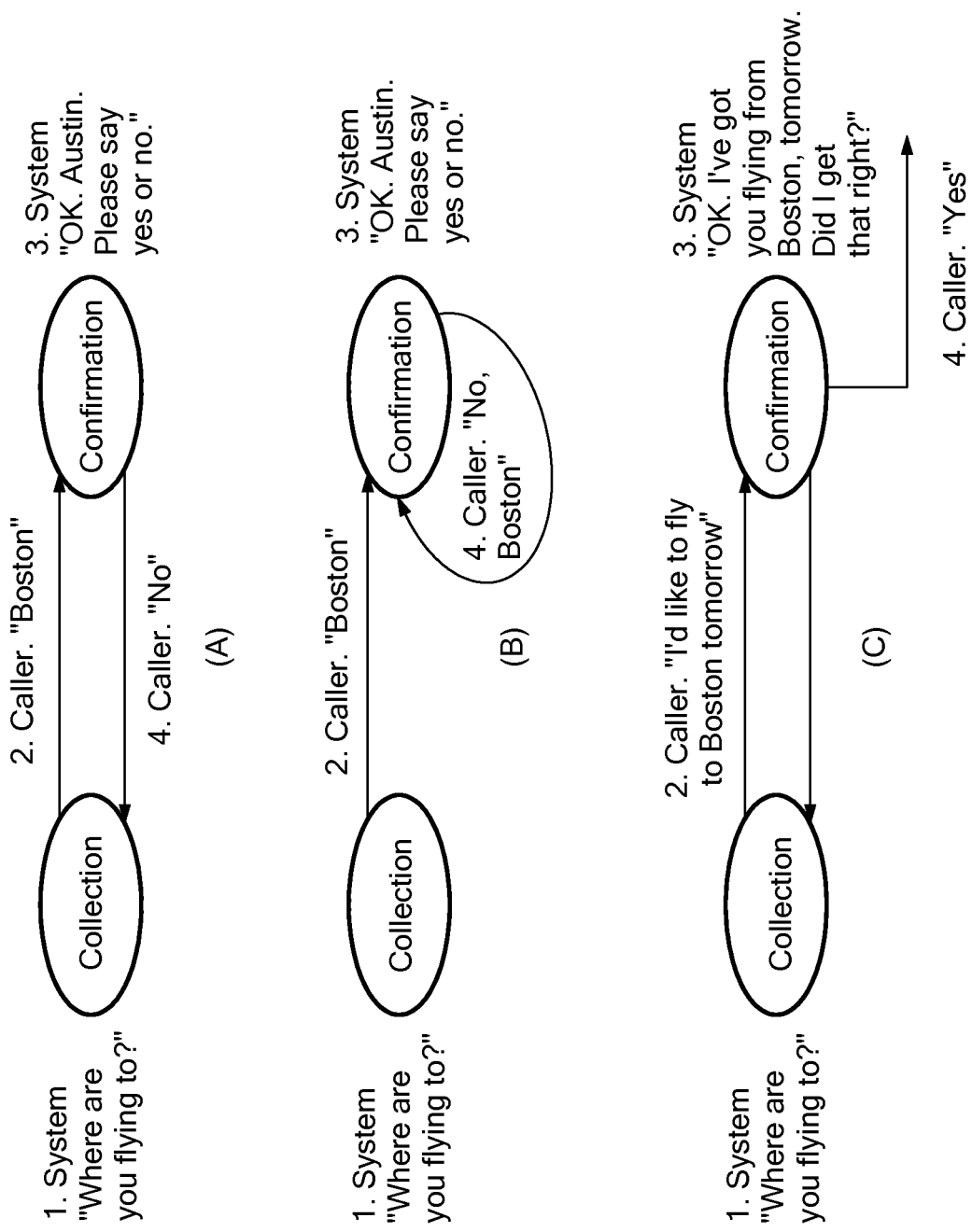
FIG. 1 A-C illustrates various ways to implement a portion of a simple dialog process.

Various embodiments of the present invention are directed to allowing voice interface designers to easily sketch out and create sample call interactions that represent how they want their dialog application to behave. The call information (e.g., prompts and grammars) stay fresh and immediately useful because it is synchronized with the different design phases.

This provides the designer with flexibility to switch between design modes that address the task they are working on.

Figure 2:
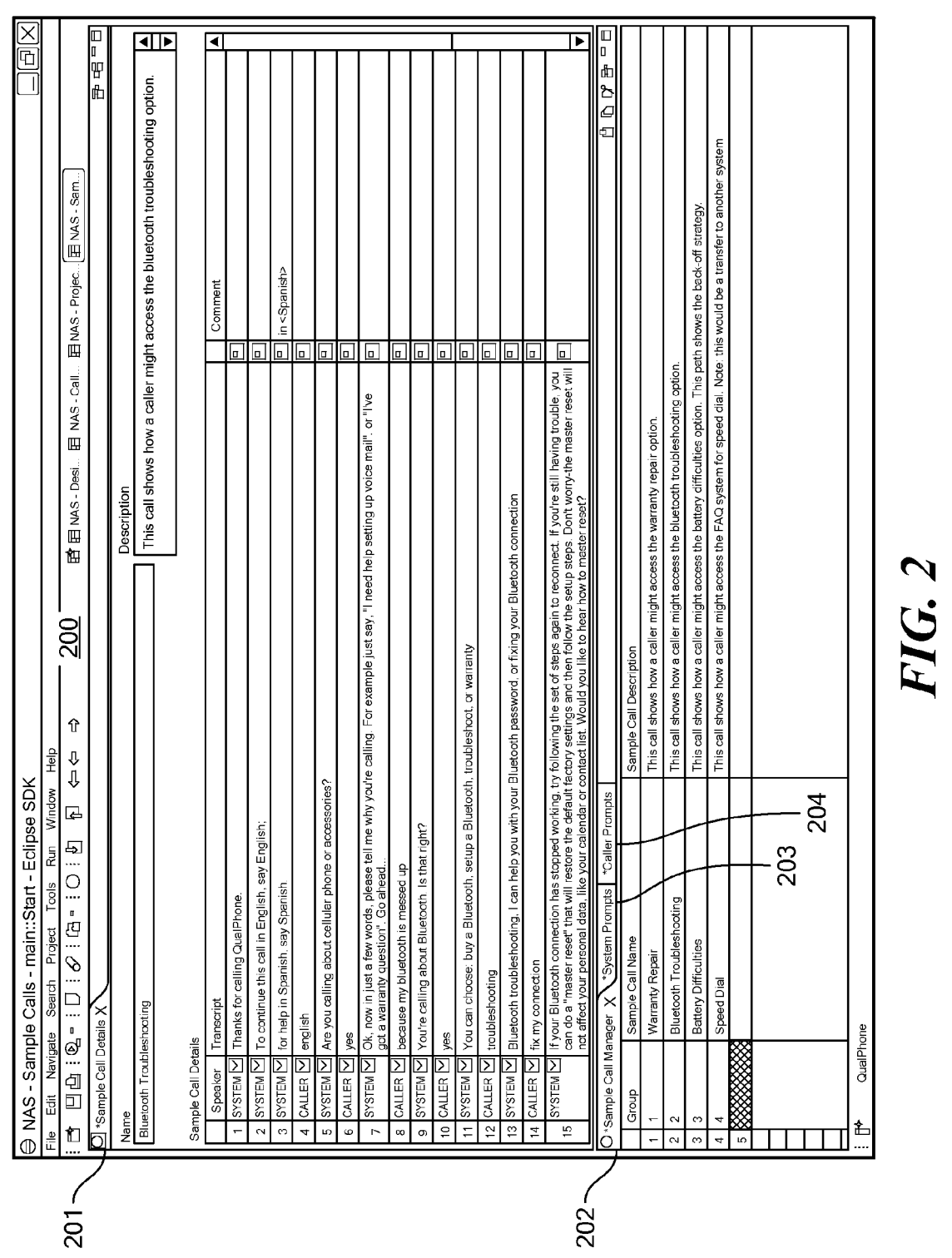

FIG. 2 shows a specific example of a design interface for creating a voice user interface for a dialog application. The example shown uses an Eclipse-based development platform and a single Sample Calls Perspective 200 to define and create the call paths of the sample calls. In this case, the Sample Calls Perspective 200 uses four views: Sample Call Details View 201, Sample Call Manager View 202, System Prompts View 203, and Caller Responses View 204. The information captured and represented in these views is synchronized with other application development perspectives such as a Call Flow Perspective, a Code Perspective, a Project Manager Perspective and/or a Design Details Perspective to maintain consistency and ease of development.

The interface designer uses the Sample Calls Perspective 200 to define an initial set of sample call paths for the dialog application. Specifically, for each sample call, the designer provides various call information specifying a sequence of system prompts and caller responses that model a user interaction through the dialog application for the sample call path. The call information input by the designer through the various views in the Sample Calls Perspective 200 is stored in a central call design database from which it is accessible and used in subsequent phases of designing the dialog system, such as for defining a full set of call paths for the dialog application. The call information in the call design database is updated to reflect current versions of the call information for all the call paths.

The Sample Call Manager View 202 presents a list of all of the sample calls available for the dialog application where each sample call represents a specific interaction path through the application. This allows the designer to create and manage the sample calls used as the dialog application is developed. In the left hand column, the Sample Calls Manager View 202 indicates the Call Group for each sample call, which represents a mechanism for grouping and ordering sample calls according to specified grouping criteria. The next column indicates the Sample Call Name, e.g., "Warranty Repair," "Bluetooth Troubleshooting," etc. The largest column on the right side of the Sample Call Manager View 202 is for Sample Call Description which provides a short characterization of each sample call.

The Sample Call Details View 201 is an editor interface that presents a detailed model of the specific path for a given sample call selected in the Sample Call Manager View 202 through the dialog application. This allows the designer to specify the interaction between the Caller and the System within a given sample call. The left most Speaker column indicates the identity of each actor at each step in the viewed call path, i.e., Caller or System. The next Transcript column provides the detailed dialog for each actor at each interaction step ("node") in the call path dialog. When the Speaker is the System, the Transcript will be the associated System Prompt (for that node). When the Speaker is the Caller, the Transcript will be the scripted Caller Response (for that node). The right hand Comment column allows explanatory annotation of any given node in the dialog. In other specific embodiments, the Sample Call Details View 201 could also provide information related to backend interactions in a given sample call and/or information regarding transitions between nodes such as "basic and unconditioned" etc.

The System Prompts View 203 is shown in FIG. 3 and lists all the System Prompts in the current dialog application project. The System Prompts are annotated with information that describes where and how they are used. For example as shown in FIG. 3, the right hand Node column indicates an identifying name for each System Prompt, e.g., LanguageSelection, TechSupport_confirm, etc. The left hand Prompt Transcript column provides the script for that System Prompt node, e.g.: "For help in Spanish, say 'Spanish.'" The System Prompts View 203 shown in FIG. 3 also includes columns for Prompt Type (e.g., Initial, Error, Confirm, etc.) and for Node Type (e.g., Recognition, Processing, Transfer, etc.).

Figure 4:
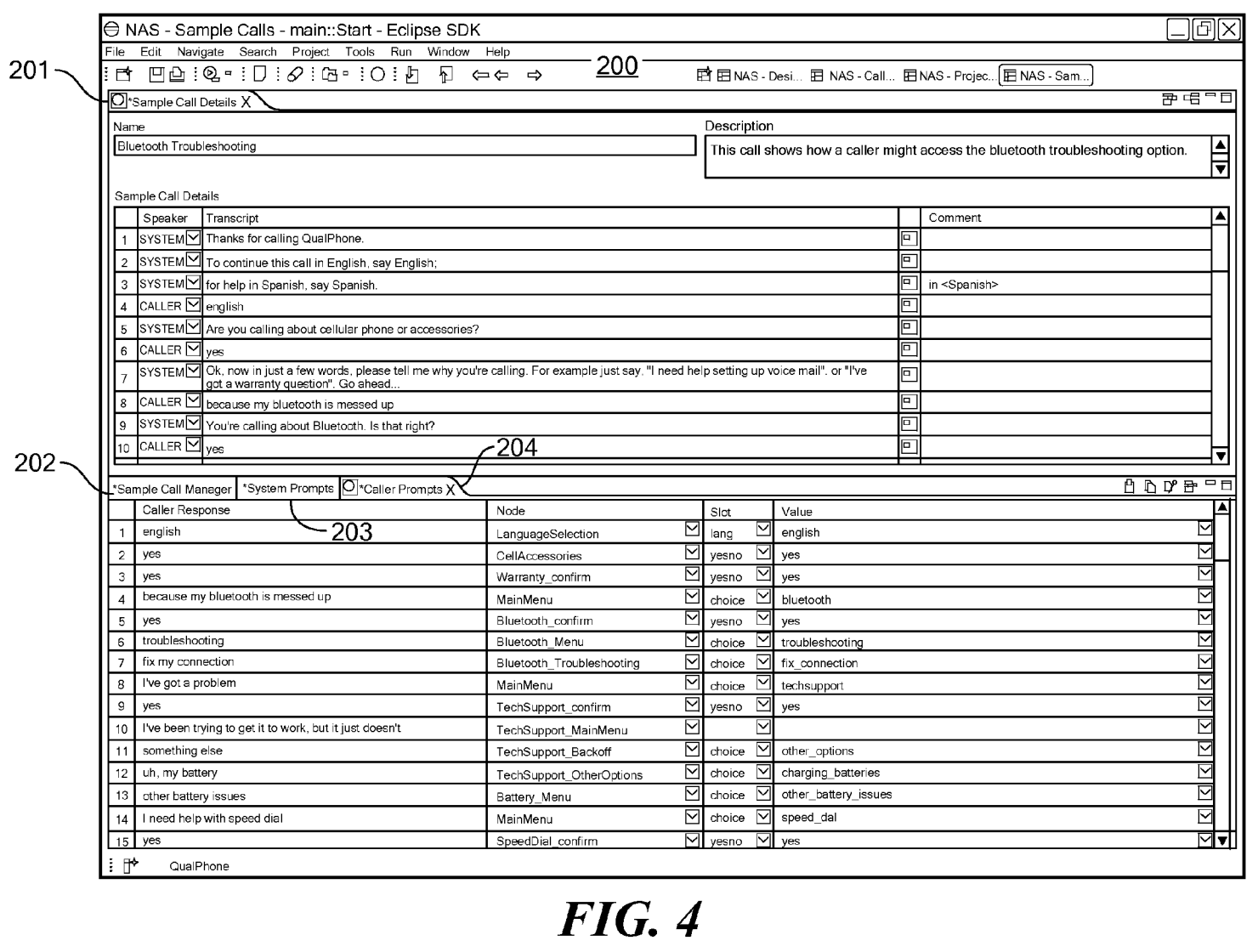

The Caller Responses View 204 is shown in FIG. 4 and lists all the Caller Responses in the current dialog application project. The Caller Responses are the scripted phrases anticipated from the Caller at a given caller node in the dialog, in the same way that the System Prompts are the scripted phrases provided by the System at a given system node in the dialog. The left hand Caller Response column provides the specific script for each Caller Response in the system (as associated with a given dialog node), e.g., "English," "yes," "something else," etc. Next to that, the Node column gives the name of dialog node associated with each specific Caller Response used in the system, e.g., LanguageSelection, CellAccessories, etc. The Slot column indicates a classification type for each Caller Response, e.g., "lang," "yesno," etc. The Value column similarly indicates a characteristic type associated with each caller node, e.g., "English," "Yes," etc. The characteristics provided in the Slot and Value columns annotate the Caller Responses with information that describes where and how each is used. The entire body of Caller Responses is used later in the design and development process to generate stub grammars for the dialog application.

The information represented in the sample calls (the System Prompts and Caller Responses) is maintained in respective storage repositories that allow the designer to use these resources in the later design and development phases. This arrangement provides the designer with a mechanism to easily reference and reuse System Prompts and Caller Responses that have already been created. These references can be linked such that the designer need only to make a change in one instance and all the other instances of that reference throughout the dialog application will also be updated. This can be a significant benefit for a designer who may sometimes find that the script text in different documents tends to diverge over time.

After a designer has entered sample calls that represent the main paths (and even edge case paths) through a design of a dialog application, there will be enough call information data amassed to be used to "pre-fill" the dialog design tool for later design phases. This call information data is usefully annotated for determining where and how to use it. To that end, the designer steps through the sample calls and annotates each System Prompt and Caller Response with call information that will determine where and how it will be used in the dialog application design. For System Prompts, the designer identifies: the prompt type (e.g., an initial or an error prompt) which determines the basic condition under which this prompt is played; the node type (e.g., whether the System Prompt precedes a recognition, follows a recognition, or follows a data base hit); and the node name (e.g., providing specific context or task defining what is being attempted when this prompt is played). For the Caller Responses, the designer identifies the name of the recognition node that the Caller Response is associated with and a semantic representation of what is "meant" by that phrase which is encoded by the Slot and Value characteristics).

Figure 5:
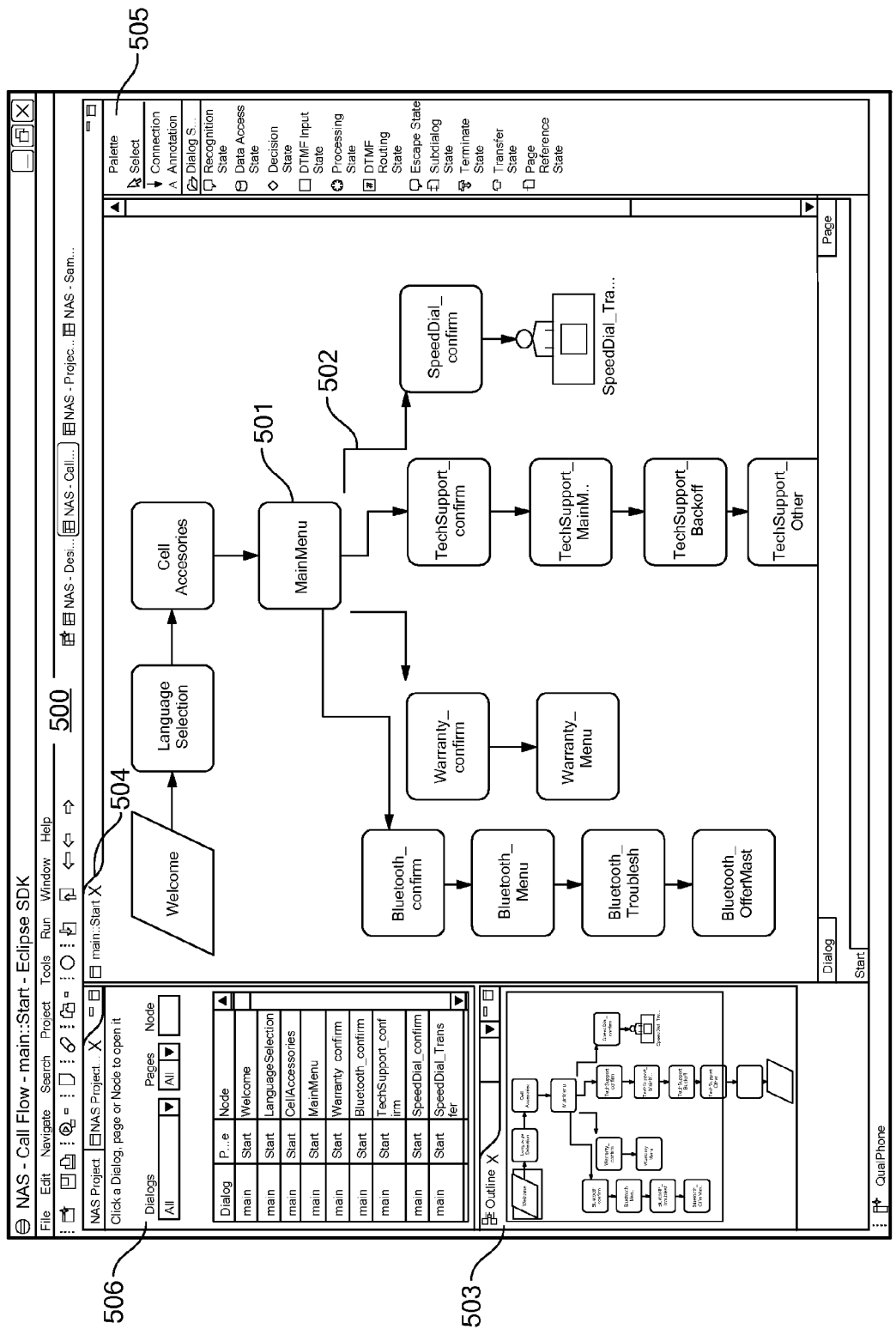
FIG. 5 shows an example of a Call Flow Perspective according to one embodiment.

Once the designer annotates the System Prompt and Caller Response call information data, a call flow representation can be created which has the nodes defined by the designer with transitions between them that are associated with the changes in the sample interactions. FIG. 5 shows an example of how this is done in one specific embodiment which uses a Call Flow Perspective 500 which shows all the various call nodes 501 and node transitions 502 for the sample call interactions as they are designed and developed. In the lower of the Call Flow Perspective 500 is an Outline View 503 which provides a visual map of all the call nodes 501 and node transitions 502 which the user can use to select a sub-area for viewing in greater detail in a zoom setting in the Call Flow Editor View 504 which allows editing of the main dialog structure in the development project. As an aid to such editing, the right side of the Call Flow Perspective 500 includes a Tool Palette 505 which includes various useful editing tools and shapes. Above the Outline View 503 is a Filter View 506 with a node search feature that helps the designer find nodes of interest.

Figure 6:
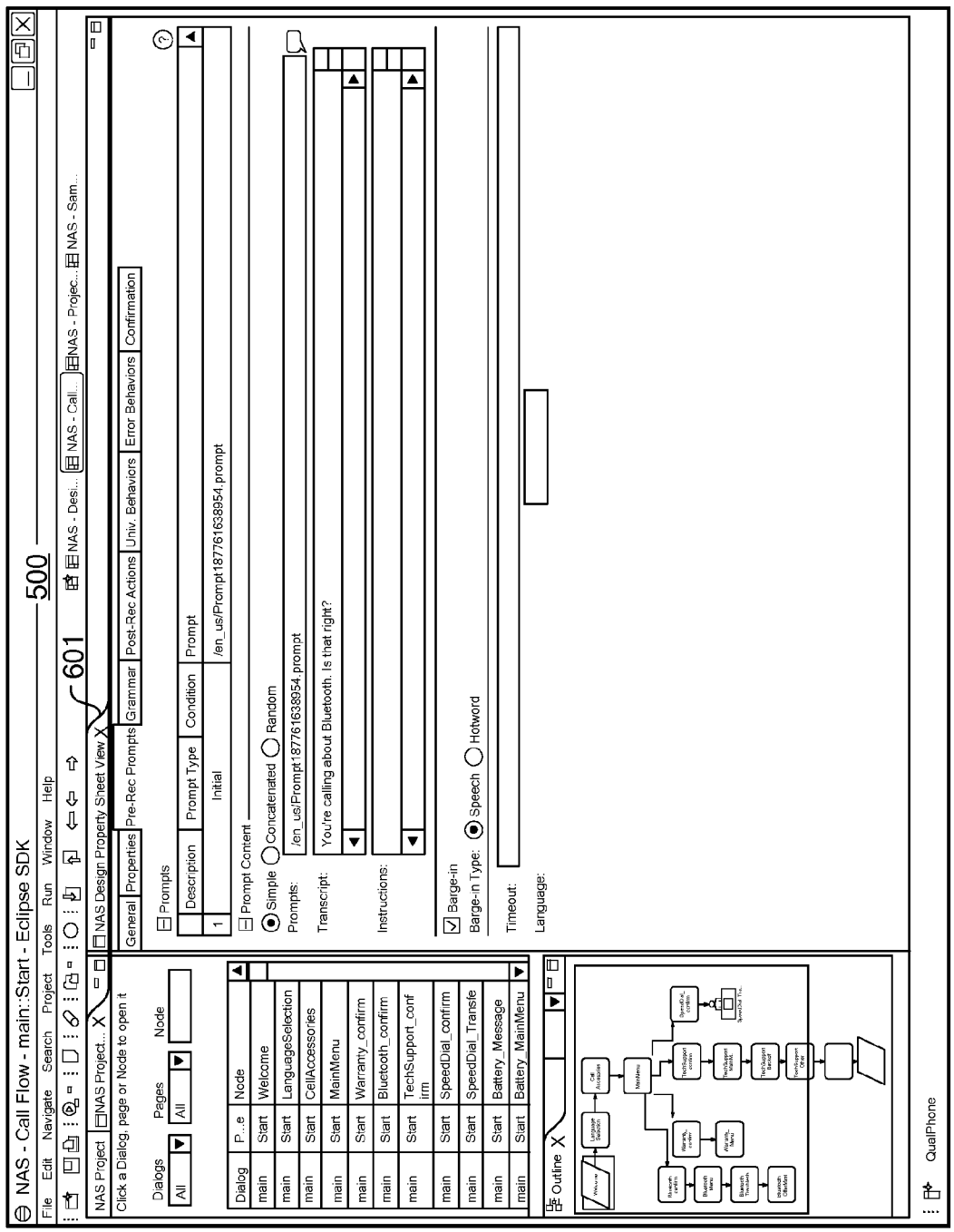
FIG. 6 shows an example of a Design Property Sheet View according to one embodiment.

For each call node 501, the System Prompts and Caller Responses are pre-filled as Design Details that can be enhanced. For example, an embodiment could use a separate Design Details Perspective, or as the embodiment shown in FIG. 6, the design details may be managed in a Design Property Sheet View 600 within the Call Flow Perspective 500. In the embodiment shown in FIG. 6, clicking on a specific call node within the Outline tab in the lower left of the Call Flow Perspective 500 opens the Design Details View 600 showing in a single view the various specific call information for the selected call node including prompt content information such as the name of the prompt and its transcript. This call information is synchronized throughout the dialog application so that changes made in the Design Details made in other dialog design processes will automatically update the prompts represented in the sample calls, keeping them up-to-date and representative of interactions with the dialog application system as a whole.

System Prompts and Caller Responses can be created in various of the design perspectives which will be added to the prompt repositories and become available for the designer to use and reference in new sample calls. Once a design for a dialog application is considered complete, sample calls can be automatically generated by stepping through the call flow and using the synchronized System Prompts and Caller Responses captured in each of the design phases. These manually created or automatically generated sample calls can be very valuable and offer a wide variety of potential uses. For example, they can be used for communication purposes between the various stakeholders involved in voice user interface application design, development, and optimization. They can also be an effective tool for quality assurance purposes, allowing the designer to validate the system design and provide scripts to external testers to facilitate thorough testing with up-to-date call information.

Embodiments of the invention may be implemented in any conventional computer programming language. For example, preferred embodiments may be implemented in a procedural programming language (e.g., "C") or an object oriented programming language (e.g., "C++", Python). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A computer implemented method of maintaining call information for creating a voice user interface, the method comprising:
   defining, by a computer system, an initial set of sample call paths for a dialog application, each sample call path having associated call information including a sequence of system prompts and caller responses that model a user interaction through the dialog application for the sample call path;
   storing, by the computer system, the call information in a call design database;
   creating, by the computer system, subsequent call paths for the dialog application based on the call information in the call design database;
   updating, by the computer system, the call design database to maintain current versions of the call information for all the call paths;
   linking, by the computer system, the call information in the call design database so that making a change in the call information in one call path causes that call information to be updated in every other call path where it is used.

2. A method according to claim 1, wherein an Eclipse-based development platform is used for defining and creating the call paths.

3. A method according to claim 2, wherein a single perspective is used for processing the call paths.

4. A method according to claim 1, further comprising:
   synchronizing, by the computer system, the current versions of the call information in the call design database with other dialog design processes.

5. A method according to claim 1, further comprising:
   listing, by the computer system, in a sample call manager view available sample call paths through the dialog application.

6. A method according to claim 1, further comprising:
   presenting, by the computer system, in a sample call details view a model of a sample call path through the dialog application.

7. A method according to claim 1, further comprising:
providing, by the computer system, in a system prompts view information related to the system prompts.

8. A method according to claim 1, further comprising:
providing, by the computer system, in a caller responses view information related to the caller responses.

9. A method according to claim 1, wherein the call information is annotated to reflect its usage in the dialog application.

10. A computer program product for use on a computer system for maintaining call information for creating a voice user interface, the computer program product comprising a non-transitory computer usable medium having computer readable program code instructions thereon executed by a processor, the computer readable program code including:
program code for defining an initial set of sample call paths for a dialog application, each sample call path having associated call information including a sequence of system prompts and caller responses that model a user interaction through the dialog application for the sample call path;
program code for storing the call information in a call design database;
program code for creating subsequent call paths for the dialog application based on the call information in the call design database;
program code for updating the call design database to maintain current versions of the call information for all the call paths;
program code for linking the call information in the call design database so that making a change in the call information in one call path causes that call information to be updated in every other call path where it is used.

11. A computer program product according to claim 10, wherein the program code is based on an Eclipse-based development platform.

12. A computer program product according to claim 11, wherein the program code uses a single perspective for processing the call paths.

13. A computer program product according to claim 10, further comprising:
program code for synchronizing the current versions of the call information in the call design database with other dialog design processes.

14. A computer program product according to claim 10, further comprising:
program code for listing in a sample call manager view available sample call paths through the dialog application.

15. A computer program product according to claim 10, further comprising:
program code for presenting in a sample call details view a model of a sample call path through the dialog application.

16. A computer program product according to claim 10, further comprising:
program code for providing in a system prompts view information related to the system prompts.

17. A computer program product according to claim 10, further comprising:
program code for providing in a caller responses view information related to the caller responses.

18. A computer program product according to claim 10, wherein the call information is annotated to reflect its usage in the dialog application.

19. A design interface for maintaining call information for creating a voice user interface, the interface comprising:
an initial set of defined sample call paths for a dialog application, each sample call path having associated call information including a sequence of system prompts and caller responses that model a user interaction through the dialog application for the sample call path;
a call design database storing the call information;
a set of subsequent call paths for the dialog application using the call information in the call design database;
updating means for maintaining in the call design database current versions of the call information for all the call paths;
linking means for linking the call information in the call design database so that making a change in the call information in one call path causes that call information to be updated in every other call path where it is used.

20. A design interface according to claim 19, wherein the call paths reflect an Eclipse-based development platform.

21. A design interface according to claim 20, wherein a single perspective is used for processing the call paths.

22. A design interface according to claim 19, further comprising:
synchronizing means for synchronizing the current versions of the call information in the call design database with other dialog design processes.

23. A design interface according to claim 19, further comprising:
a sample call manager view for listing available sample call paths through the dialog application.

24. A design interface according to claim 19, further comprising:
a sample call details view for presenting a model of a sample call path through the dialog application.

25. A design interface according to claim 19, further comprising:
a system prompts view for providing information related to the system prompts.

26. A design interface according to claim 19, further comprising:
a caller responses view for providing information related to the caller responses.

27. A design interface according to claim 19, wherein the call information is annotated to reflect its usage in the dialog application.

* * * * *